(12) United States Patent
Irwin et al.

(10) Patent No.: US 7,395,206 B1
(45) Date of Patent: Jul. 1, 2008

(54) SYSTEMS AND METHODS FOR MANAGING AND BUILDING DIRECTED DIALOGUE PORTAL APPLICATIONS

(75) Inventors: James S. Irwin, Stevens, PA (US); Alan Weiman, Elverson, PA (US); Owen Simon Dallaway, Porirua (NZ)

(73) Assignee: Unisys Corporation, Blue Bell, PA (US)

( * ) Notice: Subject to any disclaimer, the term of this patent is extended or adjusted under 35 U.S.C. 154(b) by 596 days.

(21) Appl. No.: 11/036,032

(22) Filed: Jan. 14, 2005

Related U.S. Application Data

(60) Provisional application No. 60/537,088, filed on Jan. 16, 2004.

(51) Int. Cl.
*G01L 11/00* (2006.01)

(52) U.S. Cl. .................................................. 704/270

(58) Field of Classification Search ............... 704/270.1
See application file for complete search history.

(56) References Cited

U.S. PATENT DOCUMENTS 5,694,558 A * 12/1997 Sparks et al. ............... 715/854
6,058,166 A * 5/2000 Osder et al. ............. 379/88.22

* cited by examiner

*Primary Examiner*—David R. Hudspeth
*Assistant Examiner*—Josiah Hernandez
(74) *Attorney, Agent, or Firm*—Richard J. Gregson; Robert P. Marley; Woodcock Washburn LLP

(57) ABSTRACT

A directed dialogue portal system management scheme is disclosed, providing a manager application layer over portal system managed applications. The manager application layer may include a global grammar (e.g., the grammar of each managed application) and each managed application may inherit behaviors of the manager application. Responses to prompts received by a first managed application that are unrecognized or are directed to a second managed application are sent to the manager application. The manager application sends the response to the second application. The scheme is transparent to the user and, from the user's perspective, a user is able to directly access any application or services in a directed dialogue portal system from other locations in the system.

20 Claims, 6 Drawing Sheets

SYSTEMS AND METHODS FOR MANAGING AND BUILDING DIRECTED DIALOGUE PORTAL APPLICATIONS

CROSS-REFERENCE TO RELATED APPLICATIONS

This application claims benefit under 35 U.S.C. § 119(e) of provisional U.S. patent application No. 60/537,088, filed Jan. 16, 2004, entitled "Voice Portal Applications Building Tool."

The subject matter disclosed herein is related to the subject matter disclosed and claimed in U.S. Pat. No. 5,995,918, entitled "System and Method for Creating a Language Grammar Using a Spreadsheet or Table Interface," in U.S. Pat. No. 6,094,635, entitled "System and Method for Speech Enabled Application," in U.S. Pat. No. 6,321,198, entitled "Apparatus for Design and Simulation of Dialogue," in U.S. patent application Ser. No. 09/702,224, entitled "DIALOG FLOW INTERPRETER DEVELOPMENT TOOL,", in U.S. patent application Ser. No. 10/476,746, entitled "DYNAMIC GENERATION OF VOICE APPLICATION INFORMATION FROM A WEB SERVER,", and U.S. patent application Ser. No. 10/171,921, entitled "SYSTEM AND METHOD FOR TESTING SPOKEN LANGUAGE APPLICATIONS FROM AN ABSTRACTED DESIGN." The disclosure of each of the above-referenced U.S. patents and patent applications is herein incorporated by reference in its entirety.

FIELD OF THE INVENTION

This invention generally relates to directed dialogue portal systems and specifically to managing and building such systems.

BACKGROUND OF THE INVENTION

A directed dialogue is a dialogue in which a computer is "directing" a flow of gathering information by asking a user for explicit pieces of data to perform a function. A directed dialogue portal is a collection of directed dialogues. A directed dialogue portal may be used in a construction of the internet in which a directed dialogue connection to a "directed dialogue browser" may function similar to an application server in serving requests for graphical information, services across the internet, etc. A directed dialogue may include a program that receives recorded voice containing, for example, instructions from a user. The program may receive recorded voice containing, for example, instructions from a user. The program may translate the voice instructions into software instructions that operate on a server to produce the user-desired result. In practice, other devices may be used to enter data and direct dialogue flow (e.g., DTMF). A portal may merge these functions (and the process of getting to them) to provide a collection of services or functionality.

To make these directed dialogue portals useful, application developers construct "prompts" to elicit instructions or expected responses from a user. A prompt may indicate what is going to occur next or it may be an objective of the service or application, such as when it contains user-requested information. For example, one type of "prompt-response" interaction allows the user to "navigate" through an application (e.g., service) or collection of applications (commonly referred to as a menu). Thus, a directed dialogue portal application developer may desire a user to say a name of an application or a name of a service, function, or category of services within the application. The developer thus develops the directed dialogue portal application to elicit a selection from a set of potential selections listed for the user.

Application programming for directed dialogue portals may be complicated because each function in an application may be developed separately yet need to interact with other functions. In such cases, a series of voice prompts and appropriate responses may be carefully scripted to ensure that a user is capable of eliciting an appropriate behavior from the application. For example, a voice prompt may request that a user "say or press 1 for Bob, 2 for Bill, or 3 for Sally." If the user selects 1 for Bob, a subsequent prompt may request the user to make another selection, such as whether the user wants Bob's contact information, place of employment, shoe size, etc. If the user wants Bob's contact information, a subsequent prompt may request the user to select from a list that includes Bob's home phone number, work phone number, e-mail address, home address, etc.

The user may have to go through a long series of prompts to obtain or provide desired information. If the user gets down to selecting Bob's home address, but then realizes that it was Bill's home address that is needed, then the user may need a backup pathway to go back to a preceding place in the selection process where the user may say or press 2 for Bill. Then, the user may listen to identical prompts for Bill that were provided for Bob.

Accommodating user needs to navigate outside of usual directed dialogue flow in a directed dialogue portal system having complex prompt structures may create programming problems. For example, one approach may be to flatten the hierarchical structure of the voice prompt system, allowing for transfers of call flow across branches of a directed dialogue prompt tree (e.g., enabling the user to move from Bob's contact information to Bill's contact information without requiring climbing back up the tree to the prompt that provides the choice of selecting 2 for Bill). To implement such an approach, however, typical natural language speech assistant architecture, for example, may require that the programmer update dialogue states throughout associated applications to add references to a dynamic grammar that could then be filled in at run-time with appropriate words.

Therefore, there is a need for directed dialogue portal system applications that enable users to call services, functions, or categories of services from within other services, functions, or categories without requiring the user to back out through previous selections to a branch of selections leading to the desired options. There is a need for such portals to be developed without requiring updating dialog states throughout associated applications to add references to a dynamic grammar.

SUMMARY OF THE INVENTION

The invention includes adding a manager application layer that encompasses a collection of directed dialogue functions to construct a directed dialogue portal of system applications. The manager layer may contain a global grammar that is enabled for each dialogue state in the managed application, for example, enabling it to direct user responses to appropriate directed dialogue portal system applications without requiring the user to back out of an application. The manager layer may, be an application, and the service it provides may include the ability to navigate to the desired service (e.g., a managed application). The individual system applications may be managed by the manager layer and may inherit the behaviors of the manager application. The manager application may be built in such a way that any of its necessary components can be incorporated at the appropriate place within the managed applications. At a functional level, the managed applications, for example, may inherit the grammar, navigational logic, business logic, etc., of the manager application. The introduction of this inheritance behavior may occur after the managed application has been developed, freeing the managed application developer from, for example, including the grammar of the manager in the managed application. Changes to the "manager" applications may be automatically "inherited" by the applications it manages.

In this way, for example, during execution of a first managed application, a response to a prompt may include a request to exit the first managed application and execute a second managed application. The first managed application may not recognize the response (e.g., it's grammar may not contain the command used by the user). The first managed application may then send the response (e.g., the user's response) to the manager application, enabling the manager application to process the response. The manager application's grammar may recognize a command and send the response to the second managed application for appropriate action. All of this may be transparent to the user. That is, from the user's perspective, the user is able to call upon any application, or services within an application, from anywhere in the directed dialogue portal system.

BRIEF DESCRIPTION OF THE DRAWINGS

The foregoing summary, as well as the following detailed description of preferred embodiments, may be better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Figure 1:
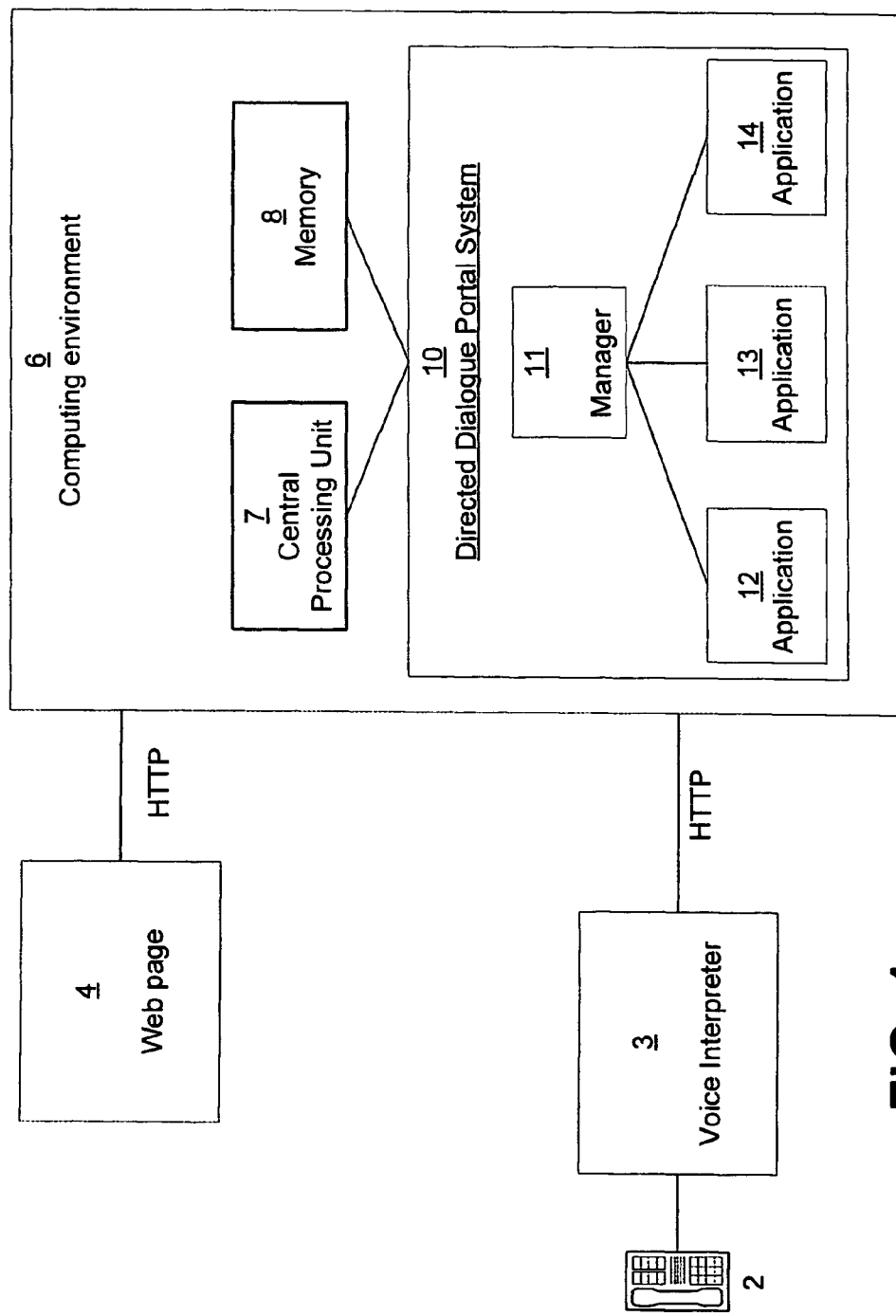
FIG. 1 is a block diagram of an example system on which a directed dialogue portal system according to the invention may be implemented.

FIG. 1 depicts a block diagram of an example system 1 on which a directed dialogue portal system 10 according to the invention may be implemented. The system 1 may include a device 2 through which a user may engage in directed dialogue with the portal system 10. The device 2 may be, for example, a telephone. The device 2 may communicate with the portal system 10 through a voice interpreter 3, for example, or any other suitable communication medium. The voice interpreter 3 may be a VoiceXML Interpreter, for example. The portal system may reside may reside on or otherwise communicate with a computing environment 6. The computing environment 6 may include any suitable central processing unit 7 and memory 8. The portal system 10 may also reside on or be in communication with the computing environment 6. Those skilled in the art will recognize that the computing environment 6 on or through which the portal system 10 operates may include any type of computer, computing device, etc.

The directed dialogue portal system 10 may include one or more applications 12, 13, 14, and each of the applications 12, 13, 14 may be a child application, having a "parent" application or a manager 11. The applications 12, 13, 14 may be herein referred to as "managed" or "child" applications because each of the applications 12, 13, 14 is associated with a manager or parent application, "i.e.", the manager 11.

A user may call the portal system 10 through the voice interpreter 3 from the telephone 2. The portal system 10 (e.g., the manager 11 or the application 12) may prompt the user to make selections or otherwise provide responses to directed dialogue inquiries. The user may verbalize responses or enter responses on a keypad of the telephone 2. Using the system 1, the user's voice speech or other input may be recognized by the portal system 10 and processed accordingly.

Figure 2:
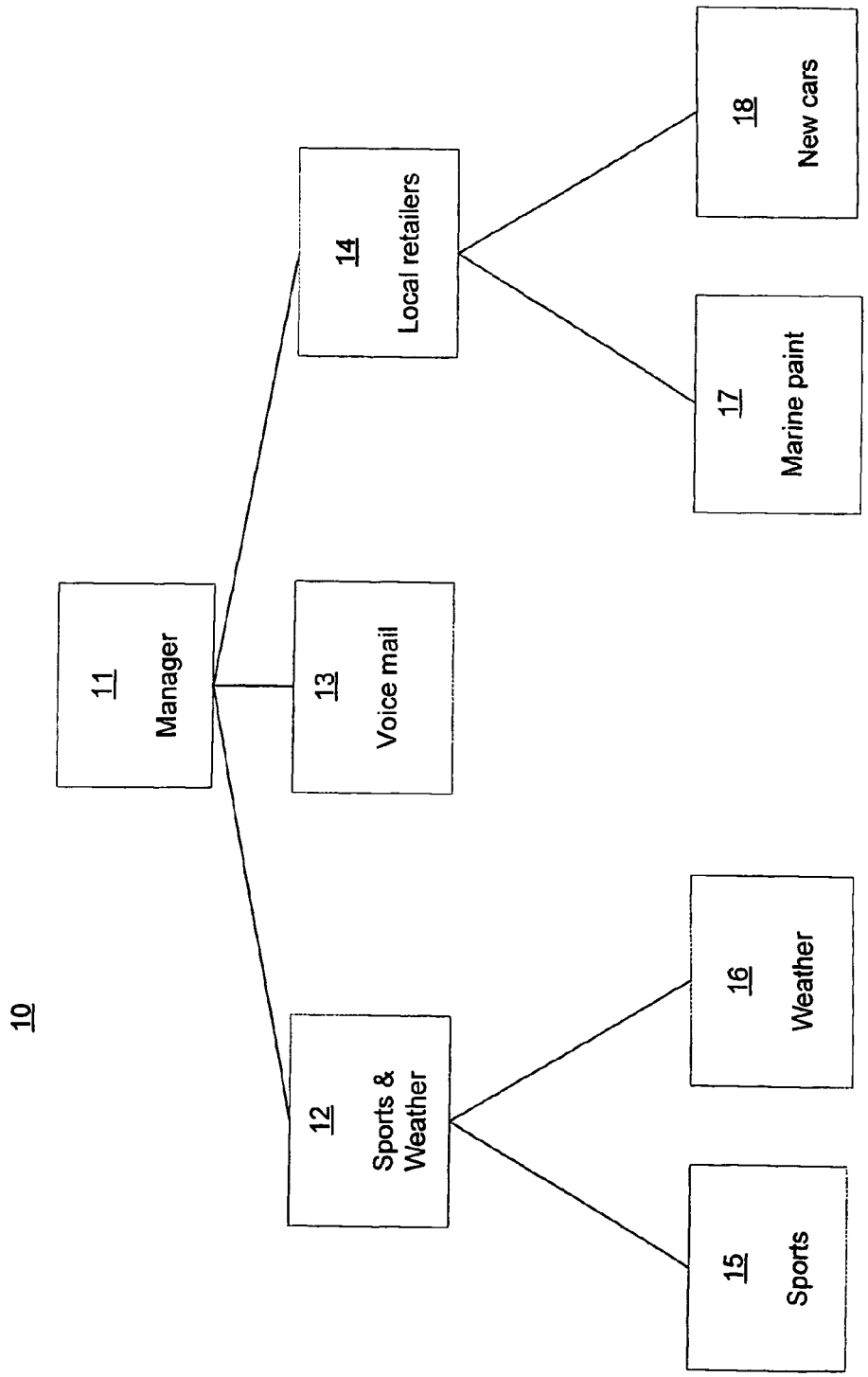
FIG. 2 is a block diagram of an example directed dialogue portal system, according to the invention.

FIG. 2 is a block diagram of the example directed dialogue portal system 10, according to the invention. The portal system 10 may include the manager 11 that "front ends" and receives control in certain situations, from the managed applications 12, 13, 14. Each of the applications 12, 13, 14 may be selected for execution by a user of the system 10 during directed dialogue communications. Of course, the system 10 may have more applications than the applications 12, 13, 14, and more managers than the manager 11. Additionally, the system 10 may have more managed applications for which each of the applications 12, 13, 14 may be a parent or managing application.

The application 12 may provide, for example, sports and weather information. The application 13 may provide access to a user's voicemail. The application 14 may provide information regarding local retailers. The sports and weather application 12 may include, for example, a sports application 15 and a weather application 16. The local retailers application 14 may include, for example, a marine paint application 17 and a new cars application 18.

Upon system execution, the directed dialogue portal system 10 may provide a listing of the available applications 14, 15, 16 to a user by voice (e.g., on a telephone system), or by any other similar directed dialogue method. A directed dialogue system may include any system, for example, that communicates with a user by providing a one-by-one listing of selectable options from a set of available options, applications, etc. That is, in a directed dialogue system, all options from a set of available options may not be available for simultaneous review. Rather, the system participates in presenting the user with a set of available options by listing a few or one at a time. If the user, for example, fails to recall previously listed options in the set of available options, the system participates in repeating, in any form, the options from the set of available options.

In contrast, for example, an initiated dialogue system, such as a computer that lists selectable applications on a display screen, may provide a set of available options at one time. Such a system need not participate further in informing the user of available applications. That is, if the computer displays a list of ten selectable applications, the computer need not "repeat" the list to the user if the user fails to recall, for example, the second application on the list. Instead, the user need only look at the display and read the second application. Therefore, in such a computer system, the user need not remember selections and the computer need not participate further in helping the user recall potential selections.

Additionally, in an initiated dialogue system, involvement by an operation system may be necessary, for example, to switch from one application to another. For example, a user may be required to click on an icon such as a start bar on a computer display. By contrast, in a directed dialogue system according to the invention, such navigation functions may appear to be "built into" the application. Second, individual applications may share little knowledge about each other but a "portal" developed in accordance with an embodiment of the invention may allow for exchange of current "session" data (e.g., data collected or generated during a conversation with a user) between applications. An embodiment of the invention may enable this navigation and data exchange into each produced application without explicit work from a developer.

A user of the directed dialogue portal system 10 may, for example, call into the system 10 and may be provided with a voice listing of the applications 12, 13, 14. For example, the user may telephone into the directed dialogue system, and the user may hear, "For sports and weather information, say 'sports and weather' or press 1; for voice mail say 'voice mail' or press 2, and for local retailers say 'local retailers' or press 3." The user may desire to hear weather information, and so the user may say the words "sports and weather" or press 1 on the telephone dialing pad or computer keyboard. The sports and weather application 12 may recognize the user's entry and commence execution. Alternatively, the manager 11 may recognize the user's entry and communicate the selection to the sports and weather application 12. That is, the manager (11) may recognize the user's input, which may indicate a transfer of control to the applications 12, 13, or 14 In this way, when the user is conversing with the manager 11, he may be navigating a menu. When the user selects the sports and weather application 12, the next input provided by the user may be directed to the application 12. In an alternative embodiment, the application 12 may also be able to listen for all the inputs recognized by the manager 11.

The sports and weather application 12 may execute and prompt the user. The user may next hear, "For sports, say 'sports' or press 4; for weather, say 'weather' or press 5." The user may, for example, say the word "weather" or press 5. The sports and weather application 12 may recognize the user's input and may direct the call flow to the weather application 16. Alternatively, the weather application 16 may recognize the input and begin execution.

In an alternative embodiment, when the system lists the applications 12, 13, 14 for selection by the user, the user may say the word "weather" instead of "sports and weather." The sports and weather application 12 or the weather application 16 may recognize this input. Alternatively, the manager 11 may recognize the user input and communicate it to the sports and weather application 12 or the weather application 16. The system 10 may discontinue listing the selectable applications 12, 13, 14 to the user, and the weather application 16 may begin execution.

If, during the execution of the weather application 16, the user, for example, learns that the day will be warm and sunny, then the user may decide to paint a boat or test drive a new car. The user thus may desire to find local retailers of marine paint or new cars. Instead of requiring the user to wait until the conclusion of the execution of the weather application 16 or requiring the user to "back-out" of the weather application 16 to the sports and weather application 12 or further to the manager 11, the user may say, for example, "local retailers" or press 3 on a telephone or computer keyboard. The weather application 16 may or may not recognize this input and may pass the command to the sports and weather application 12. The sports and weather application 12 may or may not recognize this command and may pass the input to the manager 11.

The manager 11 may recognize the input and may take control away from the weather application 16. The manager 11 may return control to the managed application 12 using a stored URL for the application 12 or may likewise pass control to the local retailers application 14 using a stored URL.

It should be recognized that there may be situations in which it is not desirable for an application such as each of the applications 12, 13, 14 to be managed by the manager 11. For example, an email reader may be part of a portal system such as the system 10 but may not allow a user to exit to another application if waiting for a user to confirm that all messages should be deleted. In such a case, the e-mail reader application may disable inheritance during a given part of a call flow (e.g., a state) or enable inheritance behavior but reject any attempt to exit by, for example providing a prompt such as "please confirm that you wish to delete your message before exiting this application."

Thus, in an alternative embodiment, the weather application 16 may refuse to relinquish control. Such refusal may be contained in the programming of the weather application 16 as a precaution for the user. A developer of the application 16 may provide reason codes for why transfer to, for example, the local retailers application 14 was not executed. There may be technology related reasons for a transfer being rejected (e.g., low confidence in the recognition of the user's input) or "domain" specific reasons for refusal (e.g., the user's account does not have enough money for a service). The application 16 may prompt the user to ensure that the user desires to exit. If the user affirms the request to exit, then the weather application 16 may relinquish control, and the manager 11 may pass the user's input for "local retailers" to the local retailers application 14.

The local retailers application 14 may then execute appropriately. The local retailers application 14 may execute and may say to the user, "for marine paint, say 'marine paint' or press 6; for new cars, say 'new cars' or press 7." The local retailers application 14 may thus execute accordingly as if it initially received the command that was actually received by the weather application 16.

Thus, the manager 11 may be responsible for maintaining a grammar that includes "cut-through" words to allow a user to move between applications (e.g., services or functions) as opposed to requiring a user to navigate up and down menu choices. The grammar in the manager 11 may include the grammar associated with each child or managed application such as the applications 12, 13, 14, and may even, if a designer desires, contain the grammar of "grand child" applications such as the applications 15, 16, 17, 18. The grammar may be associated with a controlling state of the managing application and may be constructed statically at design time or dynamically from data when an application executes. Likewise, each managed application, (e.g., the sports and weather application 12) that is a parent of a managed application (e.g., the sports application 15) may, as a matter of design choice, maintain a grammar of cut-through words for each child application.

Thus each child application such as the applications 12, 13, 14 may be constructed to manage and execute parameters so that at runtime, phrases spoken to the managed application may be passed to the managing application, i.e., the manager 11. To the manager 11, it may appear that the user communicates directly with it. Thus, a managing application may be responsible for processing communications from a user that were originally spoken in the context of one of its managed applications, such as one of the applications 12, 13, 14.

Figure 3:
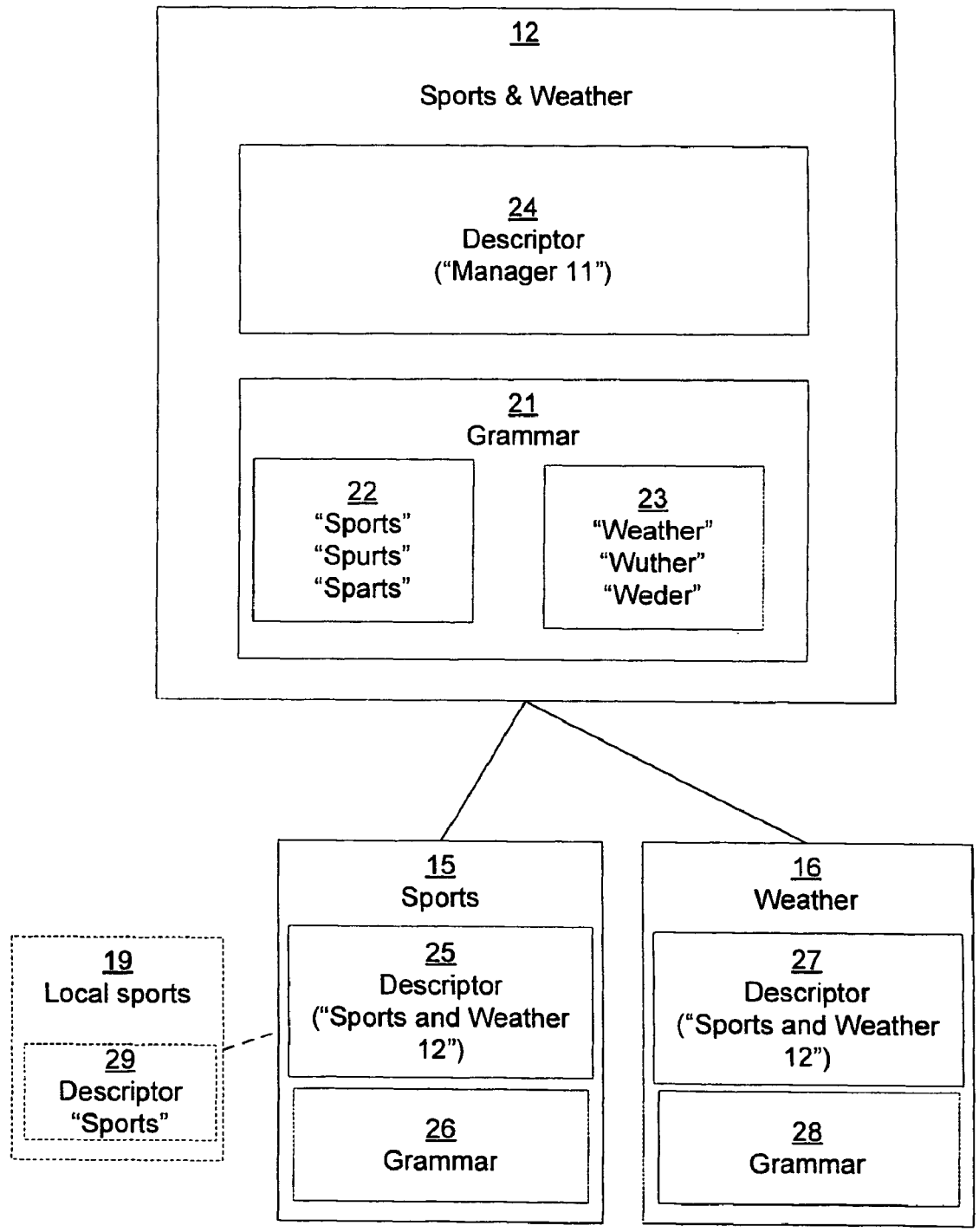
FIG. 3 is a block diagram of an example embodiment of a manager and managed applications, according to the invention.

FIG. 3 is a block diagram of an example embodiment of a manager application 12 and managed applications 15, 16, according to the invention. A manager application may be any application that includes behaviors as described herein; such as a menuing application that enables selection of a tier of applications. This menu is construction may include a grammar that enables a list of choices. Managed applications may be constructed according to the invention such that they "inherit" this grammar (list of choices) in specified contexts and in addition, when these selections are made (grammar added from managing application is matched) control is passed to the managing application as well as the recognition that caused this. A manager application may be the manager 11 or the sports and weather application 12. A managed application may be any application that inherits behaviors from another application and that includes logic for communicating recognized user inputs not for itself (i.e., put there on behalf of the managing application) to a manager application. The managed applications include the sports application 15 and the weather application 16. The applications 12, 13, 14 may each include a descriptor 24, 25, 27 that contains a name of the respective application's manager, that is, parent. In this case, the manager of application 12 is the manager 11, and the manager of the sports application 15 and the weather application 16 is the sports and weather application 12.

Each application 12, 15, 16 may also include a grammar 21, 26, 28. Each grammar 21, 26, 28 may include, for example, entries for detecting speech or voice input and or keys pressed on a telephone keypad, computer keyboard, etc. For example the grammar 21 of the sports and weather application 12 may include entries to recognize words such as "sports" and "weather." Additionally, the grammar 21 may be configured to recognize words such as "spurts" or "sparts" as being "sports," thus taking into account variability in user pronunciations of "sports." Likewise, the grammar 21 may be configured to recognize words such as "wuther" or "weder" as "weather." In an alternative embodiment, each application may communicate with a grammar that may pool recognition entries needed by each application. In this way, one grammar may be used to coordinate recognition throughout a portal system Each application 12, 15, 16 may inherit behaviors of its manager (parent). A behavior may be any logic enabling an application to direct control flow of the directed dialogue portal system to other applications based on user input, including such cases as transitions between applications, common errors, and any other behavior a developer wishes to have handled in a common way (e.g., transfer to an operator may be a service that could be built into a managing application as a behavior and then the managed application may "inherit" this when a user says, for example, "operator." Behaviors may include navigational logic, business logic, etc. That is, the application 12 may inherit the grammar of the manager 11 so that, for example, if during execution of the sports and weather application 12, a user says "voice mail" or presses 2 on a keypad or keyboard, the sports and weather application 12 may recognize the input and notify the manager 11. Alternatively, the application 12 may direct the user input to the voice mail application 13 so that the application 13 can respond appropriately. Likewise if the sports application 15 is executing and a user says "weather" or presses 5 on a phone keypad, the sports application 15 may recognize the input and either notify the sports and weather application 12 or the weather application 16 of the input.

The inherited behaviors may also include navigational logic indicating how a user may be sent from one application to another. Business logic may also be an inherited behavior and may be associated with the transfer from one application to another. That is, business logic may include considerations regarding, for example, authorizations for a transfer or the degree of confidence that the user's speech is correctly understood by the portal system or application.

A local sports application 19, for example, may be added so that it is a child of the sports application 15. In this way, a user executing the sports application 15 may be prompted to select "local sports" if desired. The local sports application 19 may include a descriptor 29 providing that the sports application 15 is its manager. The sports application 19 may thus be "plugged into" a system such as the system 10 and may inherit behaviors of the sports application 15. Such behaviors may include grammar, navigational logic, and business logic of the sports application 15. A user accessing the sports application 15 may be prompted to access the local sports application 19 and, if the local sports application 19 is executed, a user may say "weather" or press 5 on a telephone keypad, for example. The local sports application 19 may stop execution and, depending on the design characteristics of the system 10, may notify the sports application 15, the sports and weather application 12, or the weather application 16, of the user's input.

Figure 4:
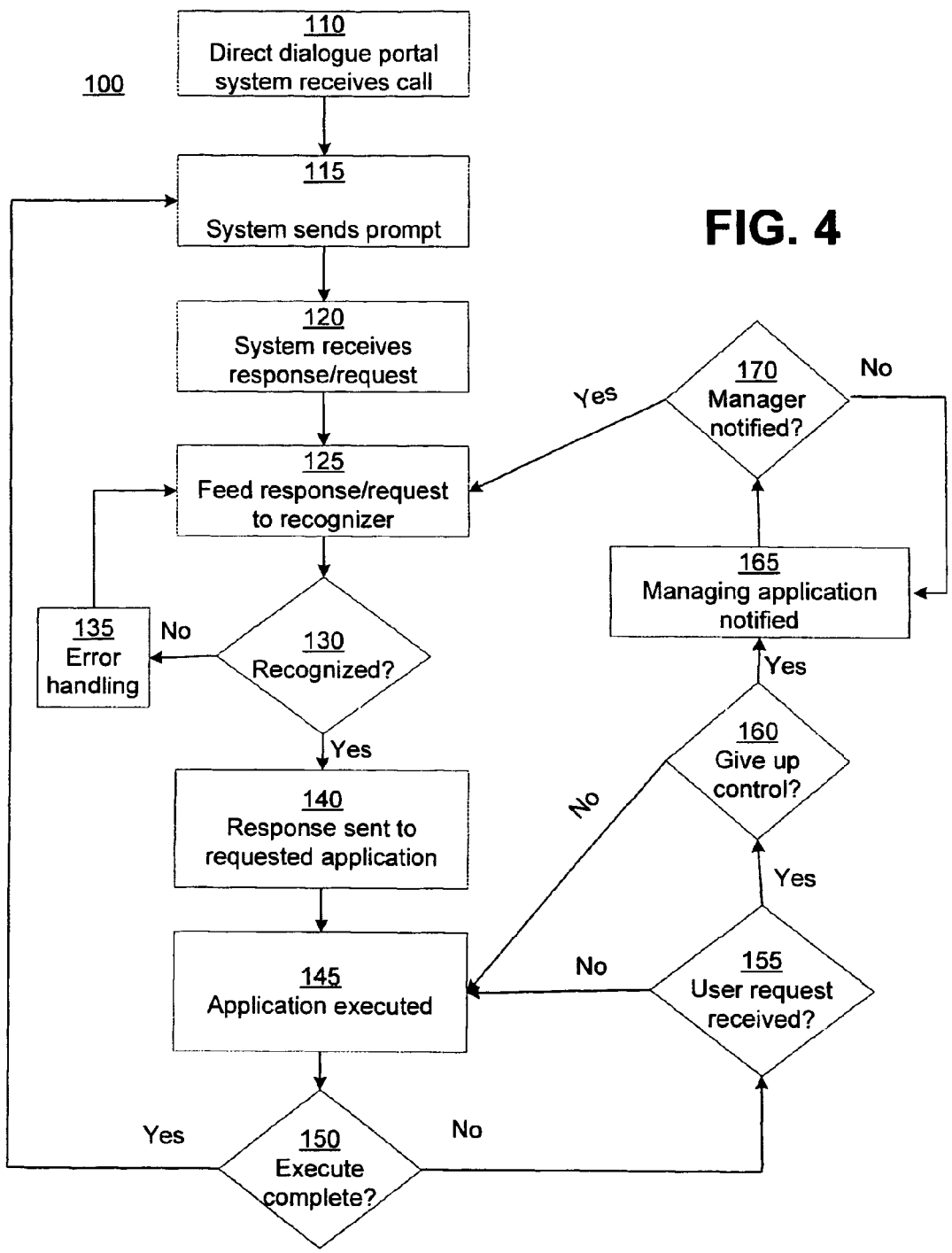
FIG. 4 depicts a block diagram of an example method for managing a directed dialogue portal system, according to the invention.

FIG. 4 depicts a block diagram of an example method 100 for managing a directed dialogue portal system, according to the invention. The method 100 may commence at step 110 with a call from a user to the portal system. Upon receipt of the call, the portal system may prompt the user, listing applications or options for potential selection from the user at step 115. The system may receive a selection from the user at step 120. The user may have selected an application, for example, through verbal speech. At step 125, the speech may be sent to a recognizer. If, at step 130, the recognizer does not recognize the user's speech or does not have a predefined confidence in the recognition, the portal system may instigate error handling procedures at step 135. Such procedures may be well-known in the art and may prompt the user to repeat his selection, make the selection through an alternative means such as pressing a key on a keypad, or indicating that the user will next communicate with an operator, etc.

If at step 130, the user's response is recognized, then the response may be sent to the request application at step 140. The application may be executed at step 145 and may continue executing until the execution is complete. If the application has not completed execution and a user input or command is received, then, at step 160, the application may decide whether it is at a point in execution where it can give up control. For example, if the application is a banking application, and the user is making a payment or transferring funds between accounts, the application may not be programmed to give up control in the midst of such operations. The application either may continue executing, ignoring the user's input, or the application may query the user to ensure that the user would like to exit the application without, for example, paying the bill or transferring the money.

If at step 160, the application decides to give up control, then the application may send the user's input or command to its parent or managing application at step 165. The managing application may recognize the command or input and send the input or command to a child application or may send the input or command to a manager. If at step 170, a manager is notified or is given the input or command, then the input or command may be sent to a recognizer for further processing in accordance with the invention. Of course, the method 100 is merely one example of a way to implement a directed dialogue portal system consistent with the invention. There are many variations, alternatives, or additions that may be included in the method 100, and steps in the method 100 may be removed, consistent with the invention.

Figure 5:
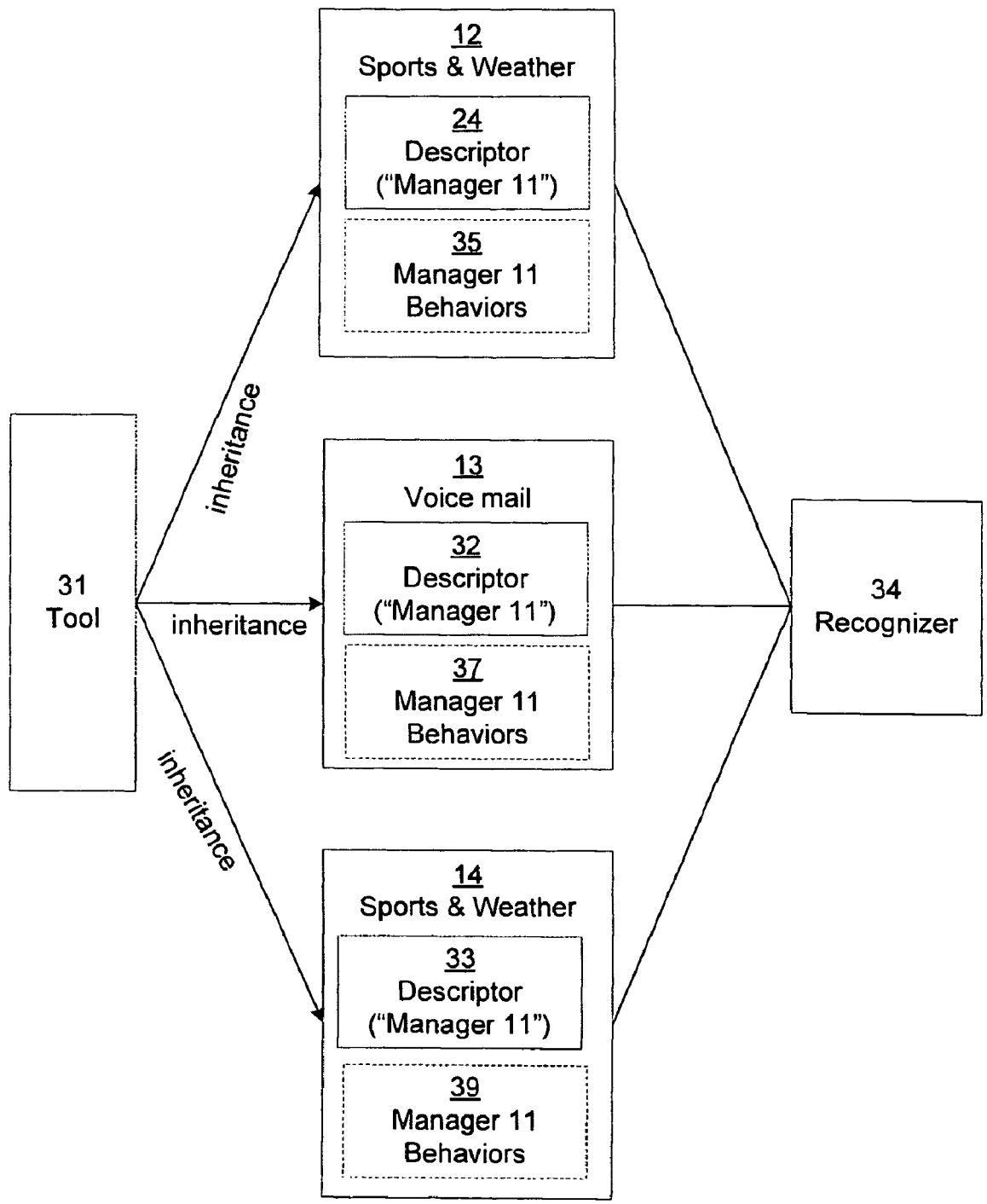
FIG. 5 depicts a block diagram of an alternative embodiment of an example directed dialogue system, according to the invention.
Figure 6:
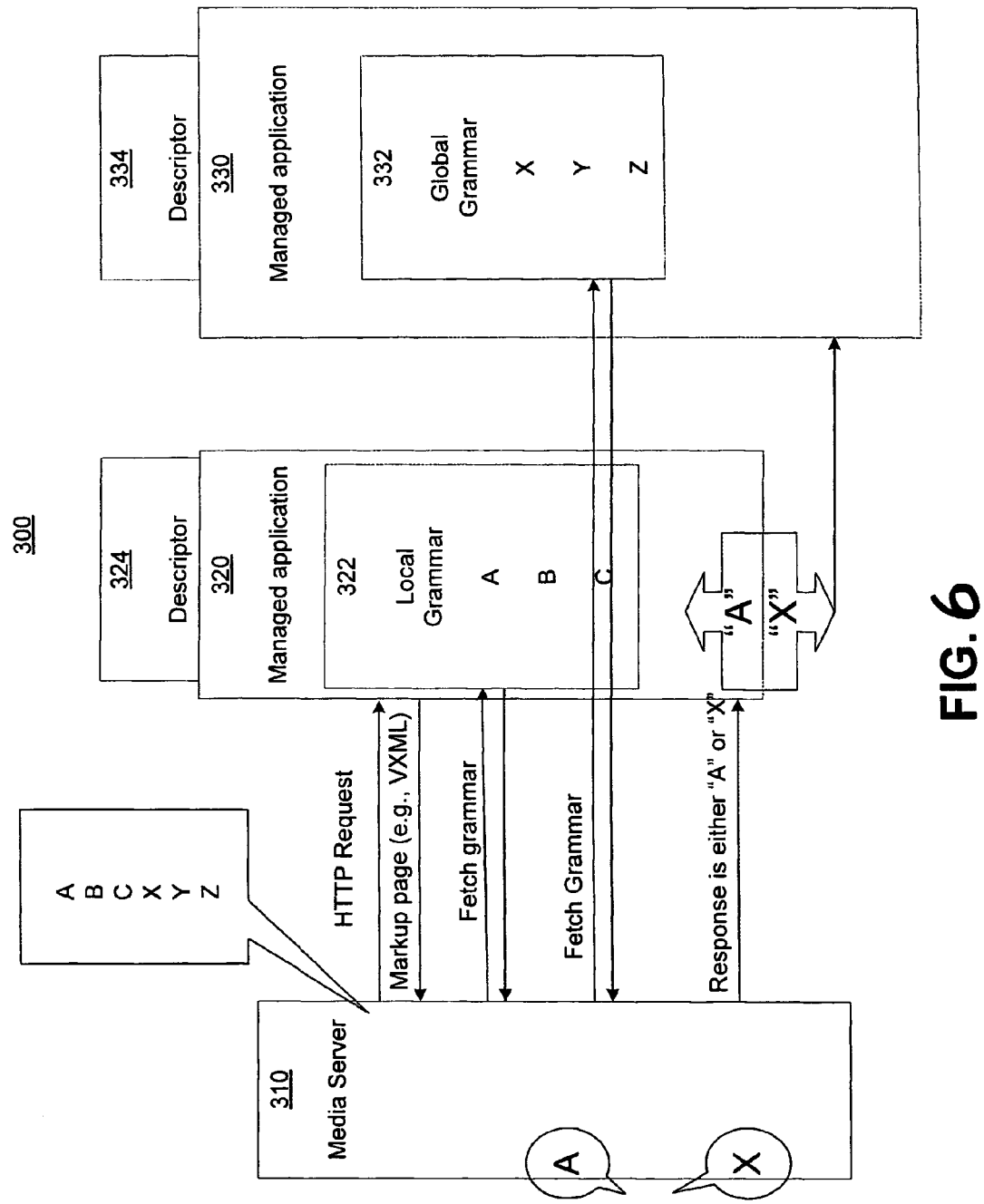
FIG. 6 depicts a block diagram of an example method for providing inheritance to a managed application to be used in a directed dialogue portal system, according to the invention.

FIG. 5 depicts a block diagram of an alternative embodiment of an example directed dialogue system 30 according to the invention. The system may include the applications 12, 13, 14 in communication with a behavior 34. That is, each application 12, 13, 14 may not each include an individual behaviors but may instead use the behavior 34. The behavior 34, for example, may recognize certain grammar or words associated with each of the applications 12, 13, 14, such as "sports," "weather," "voice mail," "local retailers," etc. Each application 12, 13, 14 may include a descriptor that indicates the manager, that is, parent, of the application. In the example embodiment depicted in FIG. 5, the manager for each of the applications 12, 13, 14 is the manager 11 (not shown).

The system 30 may include a tool 31 for managing the relationships between applications 12, 13, 14 as well as providing certain functionality to each of the applications 12, 13, 14. The tool 31 may build the application such that the functionality may be present when the application executes. The tool 31 may be included in the service creation environment of the family of application development tools that comprise the Natural Language Speech Assistant (NLSA) developed by Unisys Corporation of Blue Bell, Pa. Integrated service creation environments, like the Unisys NLSA, may enable a developer to generate a series of data files that define dialogue, e.g., call, flow if a speech application as well as prompts to be played, expected user responses, and actions to be taken at each state of the dialogue flow. The data files output from the service creation environment may include sound files, grammar files (to constrain the expected user responses received from a recognizer), and files that define dialogue flow in a form used by a dialogue flow interpreter. Further details regarding the NLSA or the integrated service creation environments are provided in U.S. Pat. Nos. 5,995, 918 and 6,321,198, and in U.S. application Ser. No. 09/702, 244. Of course, the NLSA offers merely one example platform through which the tool and the directed dialogue portal system may be implemented consistent with the invention.

The tool 31 may, through interaction with a human that designs the services, capture relationships between the various applications, particularly the "parent-child" relationships in embodiments of the invention. The tool, having captured the designer's intent, then may produce a descriptor 24, 32, 33 of each of the applications 12, 13, 14 to define the manager for the applications 12, 13, 14. The tool may next provide additional infrastructure to each application 12, 13, 14 which, when combined with the descriptor, may allow the application to functionally "inherit: behaviors of the parent program (the manager 11). Such inheritance may include providing each of the applications 12, 13, 14 with the manager 11 behaviors 35, 37, 39. Such behaviors may include the grammar, business logic, navigation logic, etc., of the manager 11. The tool 31 may produce each application such that it automatically performs this inheritance function, thus enabling the applications 12, 13, 14 to be developed independently, without regard to the, for example, grammar of the manager 11. The developer of the applications 12, 13, 14, through the tool as described herein, may include information necessary for the tool 31 to provide inheritance, such as including the name of the application's parent in the descriptor 24, 32, 33. In this way, applications 12, 13, 14 may be developed independently and later added to a directed dialogue portal system such as the system 10.

The tool 31 may collect an abstract design definition (e.g., words and flow exchanged in a dialogue) rather than a language-specific implementation of that dialogue (e.g., Voice XML). The abstract relationship may be extended to include other managers (e.g., parents) that may be shared across a suite of applications. The tool 31 thus may render this abstract design into a specific implementing technology. The tool 31 additionally may construct managed applications (e.g., the applications 12, 13, 14) that reference the managing application such that the managed applications incorporate behaviors of the managing application.

A method for providing inheritance to a managed application to be used in a directed dialogue portal system, may commence, and the tool 31 may obtain a name of a manager (parent) application from the descriptor of the managed application. A developer of the managed application may include this name during the construction of the application. The tool 31 may enable the managed application to execute the behaviors (e.g., the grammar, navigational logic, business logic, etc.) of the managing application to be inherited by the managed application. The tool may also construct the managed application such that it enables or uses the grammar of the managed application. This grammar may be applied to the manager application and also may be applied to each child of the manager application, which are the "siblings" of the managed application. In this way, when the manager application executes, it may use the grammar, navigational, and business logic with which it was designed. Also, each "managed" application may be constructed to also use these elements by referencing them (at runtime) in the managing application.

A directed dialogue portal system according to the invention may be developed in any appropriate software language such as, for example, Java, Voice XML, etc. The grammar may be fetched and incorporated into served Voice XML pages, for example. Voice XML pages for each managed application such as the applications 12, 13, 14 may be generated to include the global grammar of the manager 11.

In an alternative embodiment, the manager 11 may pass the behaviors on an initial URL that starts a managed application. The manager 11 may create variables such as managing_application_URL, managing_application_response_URL, managing_application_DTMF_response_URL, and managing_application_controlling_state. The managing application may provide appropriate content for each of these string variables and include a list of variables sent to the managed application. In this manner, the manager application determines the services it will manage.

FIG. 7 is a block diagram of an alternative directed dialogue system 300 according to the invention. The system 300 may show controlling relationships between a managing application 320 and a managed application 330. The managing/managed applications 320, 330 may execute in a standard J2EE web application container. They are accessed by the media server 310 via http requests which are processed by the applications which in turn render presentation pages (e.g., VoiceXML) which are sent back to the media server for processing. When the presentation page is rendered, it may include two grammar urls—one that points to the managed application's local grammar 322 and a second URL that points to the managing application's "global" grammar 332 that contains "cut through" phrases such as the names of other managed applications. FIG. 7 may further depict the fact that as the media server 310 is processing the rendered page, it may fetch both the local and the global grammar 322, 332. Both grammars 322, 332 are then loaded into a recognizer. If a user responds to a prompt, either the local grammar 322 or the global grammar 332 may "fire" (match) the response. The managed application 322 may be told in the resulting http request whether the local grammar 322 fired (in which case the managed application 320 may continue to execute) or the global grammar 332 fired (in which case control is passed to the managing application 330). The managed application may have the ability to override this default behavior and not forward control to the managing application 330.

The programming necessary to effectuate the processes performed in connection with the present invention may be relatively straight-forward and should be apparent to the relevant programming public. Any particular programming language or methods may be employed to effectuate the present invention without departing from the spirit and scope thereof.

In the foregoing description, it can be seen that the present invention comprises a new and useful mechanism for managing objects. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed:

1. A directed dialogue portal system, comprising:
   a manager application comprising a behavior;
   a first and a second managed application associated with the manager application, wherein the first and the second managed application each inherit the behavior;
   wherein an input associated with the second managed application is received during execution of the first managed application, wherein the first managed application sends the input to the manager application pursuant to the behavior, and wherein the manager application recognizes the input as being associated with the second managed application.

2. The system of claim 1, wherein the manager application sends the input to the second managed application.

3. The system of claim 1, further comprising:
   a speech recognition device for recognizing the input, wherein the input is a verbal communication.

4. The system of claim 3, wherein the input is communicated from a telephone.

5. The system of claim 1, further comprising:
   a prompting device for sending a directed dialogue prompt to the user;
   an input device for receiving the input from the user; and
   a recognizer for recognizing the input.

6. The system of claim 1, wherein the behavior comprises grammar.

7. The system of claim 1, wherein the behavior comprises navigational logic.

8. The system of claim 1, wherein the behavior comprises business logic.

9. The system of claim 1, wherein the first managed application comprises a first grammar, wherein the second managed application comprises a second grammar, and wherein the manager application comprises the first and the second grammar.

10. The system of claim 1, wherein the manager application comprises a listing comprising:
    the first managed application and valid user inputs for the first managed application; and
    the second managed application and valid user inputs for the second managed application.

11. A method of constructing a directed dialogue portal system, comprising:
    obtaining a name of a manager application comprising a behavior from a first and a second managed application; and
    applying the behavior of the manager application to the first and the second managed application, wherein an input associated with the second managed application received during execution of the first managed application is sent to the manager application pursuant to the behavior, and wherein the input is recognized as being associated with the second managed application.

12. The method of claim 11, further comprising:
    sending a directed dialogue comprising a listing of a name of the first and of the second managed applications; and
    receiving an input that selects the first managed application.

13. The method of claim 12, wherein sending the directed dialogue comprises using a voice interpreter.

14. The method of claim 11, further comprising:
    applying grammar of the first and the second managed application to the behavior of the manager application, wherein the grammar comprises a name of the first and the second managed application.

15. The method of claim 11, wherein the behavior comprises grammar.

16. The method of claim 11, wherein the behavior comprises navigational logic.

17. The method of claim 11, wherein the behavior comprises business logic.

18. A computer-readable medium having computer-executable instructions for performing steps, comprising:
    obtaining a name of a manager application comprising a behavior from a first and a second managed application; and
    applying the behavior of the manager application to the first and the second managed application, wherein an input associated with the second managed application received during execution of the first managed application is sent to the manager application pursuant to the behavior, and wherein the input is recognized as being associated with the second managed application.

19. The computer-readable medium of claim 18, having further computer-executable instructions for performing the steps of:
    applying grammar of the first and the second managed application to the behavior of the manager application, wherein the grammar comprises a name of the first and the second managed application.

20. The computer-readable medium of claim 18, having further computer-executable instructions for performing the steps of:
    sending a directed dialogue comprising a listing of a name of the first and of the second managed applications; and
    receiving an input that selects the first managed application.

* * * * *